United States Patent [19]

Kronenberg et al.

[11] 4,019,058
[45] Apr. 19, 1977

[54] CHARGE TRANSPORT TACTICAL DOSIMETER

[76] Inventors: Stanley Kronenberg, Hollow Road, Skillman, N.J. 08558; Robert A. Lux, 891 Knight St., Toms River, N.J. 08753

[22] Filed: Oct. 23, 1975

[21] Appl. No.: 625,341

[52] U.S. Cl. .............................. 250/376; 250/377; 250/378
[51] Int. Cl.² ......................................... G01T 1/18
[58] Field of Search .................. 250/376, 377, 378

[56] References Cited

UNITED STATES PATENTS

| | | | |
|---|---|---|---|
| 2,751,544 | 6/1956 | Stirnkorb | 250/377 |
| 2,980,799 | 4/1961 | Bongrain et al. | 250/376 |
| 3,249,755 | 5/1966 | Pawar | 250/378 |

FOREIGN PATENTS OR APPLICATIONS 857,762  1/1961  United Kingdom ............... 250/376

*Primary Examiner*—Harold A. Dixon

[57] ABSTRACT

A quartz fiber electroscope shunted by a variable capacitor is periodically coupled to a radiation detection capacitor formed of material of a relatively large atomic number, e.g. aluminum, completely surrounded by a material of lesser atomic number, e.g. polyethylene. An electrical charge is induced by neutron or gamma radiation on the material of relatively large atomic number which charge is then coupled to the electroscope and variable capacitor combination. The variable capacitor is set at its maximum when the voltage is transferred from the detection capacitor. The variable capacitor is then reduced, thus raising the voltage on the electroscope with the dose being determined by the reduction in capacitance necessary to raise the indicated electrometer voltage to a predetermined magnitude. The variable capacitor includes indicia thereon which is calibrated such that the voltage change provides a direct reading of the charge transfer and consequently dosage.

16 Claims, 4 Drawing Figures

CHARGE TRANSPORT TACTICAL DOSIMETER

The invention described herein may be manufactured and used by or for the Government for governmental purposes without the payment of any royalties thereon or therefor.

BACKGROUND OF THE INVENTION

This invention relates generally to dosimeters of the type which may be carried by persons who may be exposed to radiation hazards and more particularly to a dosimeter sensitive to neutron and gamma radiation and being of the type that have built into them a quartz fiber electroscope.

It is a primary object of the present invention to provide a tactical dosimeter which is adapted to provide a person, for example a troop commander, with data about the current radiological status of his troops during the conduct of a battle in which tactical nuclear weapons are used.

Dosimeters of the type that are carried by persons who may be exposed to radiation, e.g. X-ray or gamma ray radiation, typically are comprised of a low power microscope which is mounted rigidly in a tube so that it is in focused relationship with a movable central portion of a quartz fiber which is covered with a platinum coating so as to render it conductive. The fiber is attached to a wire frame so that it is in an inverted U-shaped position. A portion of the wire frame is roughly parallel with the fiber, so that when fiber and frame are charged, the fiber is repelled from the frame and attached to the adjacent grounded wall of the tube in which the microscope and fiber support frame are mount. As a result, the fiber is caused to move across the field of view of the microscope as the potential of the quartz fiber support frame is varied.

U.S. Pat. No. 2,648,777 issued to O. G. Landsverk is illustrative of such a device. In addition to the means already noted, such devices include means in the support frame in order to charge the fiber negatively, whereupon the fiber is repelled from the frame. Subsequent to charging, a given radiation dosage causes ionization to occur in the surrounding medium adjacent the fiber whereupon the electrometer becomes partially discharged. The amount of movement the fiber has undergone during the discharge is indicted by the position of the fiber image on a reticle, thus providing a reading of the accumulated dosage to which the device has been exposed since the last charging process of the electroscope.

SUMMARY

Briefly, the subject invention is directed to a radiation dosimeter sensitive to neutron and gamma ray radiation and comprises in its broadest aspect a radiation detection capacitor, which is adapted to accumulate electrical charge in the presence of radiation, periodically coupled to a quartz fiber electroscope shunted by a variable capacitor. The radiation detection capacitor is formed of a layer of a material having a relatively large atomic number, for example aluminum, completely surrounded by a material of lesser atomic number, such as polyethylene. The charge accumulated by the radiation detection capacitor is transferred to the electroscope and selective variation of the variable capacitor is adapted to raise the electrometer voltage to a predetermined value which variation of the capacitor provides a direct reading of the dosage of radiation detected. In its preferred form, the subject invention is configured as a tubular type electroscope surrounded on its outside surface by the detection capacitor. Both elements are located in a metal tubular housing. The variable capacitor is mounted on the outer surface of the tubular housing, having a fixed plate attached to one end of the housing while the other plate is slidably movable thereon. The distance between the plates of the variable capacitor is graduated on the housing surface to provide a direct reading of the dosage measured.

DESCRIPTION OF THE PREFERRED EMBODIMENTS

Prior to discussing the present invention in its structural details, several comments appear to be in order regarding the detection of gamma rays and neutrons. With respect to gamma rays, they interact in matter to produce energetic electrons. These electrons travel in the general direction of the gamma rays, but can change their direction by Rutherford scattering. The probability of large angle Rutherford scattering increases with the atomic number (Z) of the material and therefore the current of electrons becomes perturbed in a layer of relatively higher atomic number material that is embedded in a relatively lower atomic number matrix. This perturbation causes the interior higher Z layer to become positively charged. Additionally, if the perturbing layer is sufficiently thin, it does not significantly influence the generation of energetic electrons. This effect has been described in a publication entitled "Gamma Ray Induced Charge Build Up In Insulators," S. Kronenberg, et al., *IEEE Transactions on Nuclear Science*, Volume NS-21, December, 1974, pp. 243–248. The magnitude of charge transfer is dependent upon the type of material utilized. For example, where lead foil is embedded in a polyethylene terephthalate, commonly referred to as "Mylar", the charge transferred to the lead foil is typically in the order of $1.5 \times 10^{-12}$ C/cm². rad whereas for aluminum foil in a "Mylar" matrix, the charge transfer is in the order of $5 \times 10^{-13}$ C/cm². rad.

Regarding the detection of neutrons, incident fast neutrons generate energetic recoil protons in a hydrogenous material such as polyethylene. If a relatively high Z material is embedded in this hydrogenous material, and is electrically insulated from it, some of the protons will penetrate into the higher Z material, charging it positively. The recoil atoms generated in the higher Z material have a very small range and therefore the probability of the reduction of the positive charge accumulated due to escape of these recoil atoms is relatively small. The magnitude of the positive charge transport can be calculated for example by means of the method set forth in a publication entitled "Energy Spectrum of Protons Emitted From a Fast Neutron Irradiated Hydrogenous Material", S. Kronenberg, et al., Radiation Research, Vol. 12, 1960, pp. 728–735. In cases where polyethylene for example is used as the hydrogenous material, the charge transport amounts to $4 \times 10^{-14}$ C/cm$^2$rad.

Figure 1:
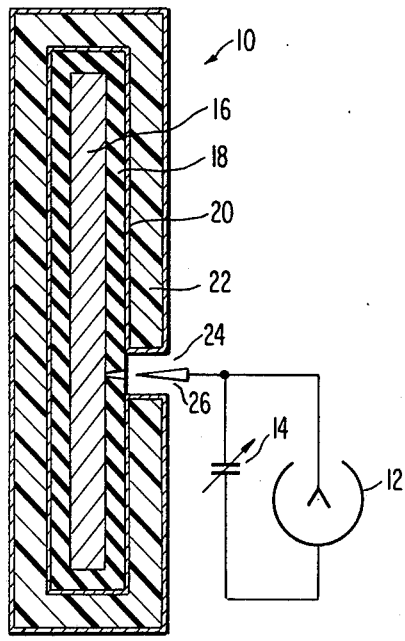
FIG. 1 is a schematic diagram broadly illustrative of the subject invention.

Referring now to FIG. 1, there is schematically disclosed what might be considered a basic cofiguration of the subject invention and one consisting of a radiation detection capacitor 10 coupled to an electroscope 12, and a variable capacitor 14 shunting the electroscope. The detection capacitor 10 is comprised of a plate 16 of relatively high atomic number conductor, preferably of aluminum, completely surrounded by a thin layer 18 of a high quality lower atomic number insulator 18, preferably polyethlene terephthalate or "Mylar". The outside of the insulating layer 18 is coated with a relatively low atomic number conductive layer or film 20 of graphite, which may be in the form of a concentrated colloidal dispersion of pure graphite in water marketed under the name of "Aquadag"Next, the elements 16, 18 and 20 are surrounded by a layer 22 of hydrogenous material which may be, for example, polyethylene. A small opening 24 is provided in the hydrogenous material layer 22 for the insertion of a point or needle contact element 26, which is selectively inserted into the layer 18 to make contact with the aluminum conductive layer 16. The point contact or needle probe 26 is thus electrically connected to the quartz fiber electroscope 12 and variable capacitor 14. It should also be noted that the low Z conductive layer or film 20, which is disposed between the layers 18 and 22, is also disposed on the outer surface of the layer 22.

In the case of the Landsverk type dosimeters, the device is charged prior to its exposure to radiation, whereupon ionization of the surrounding atmosphere, for example air, tends to deplet the charge accumulation and thus provide a reading of the radiation dose encountered. In the subject invention, this is not the case. On the contrary, the electroscope 12 is only connected to the detector capacitor 10 after exposure to radiation which by a momentary depression of the needle element 26 through the insulating layer 18 to the higher Z layer 16, the needle element acts as a switch to transfer the electrical charge from the layer 16 to the electroscope 12, whereupon a reading of the dosage encountered is provided by manipulation of the variable capacitor 14.

It should be pointed out that the puncture in the insulator layer 18 by the needle element 26 which might be referred to as a "zero volume switch", is too small to influence the subsequent performance of the system. The capacitance of the detector capacitor 10, moreover, is much larger than the capacitance of the variable capacitor 14 of the electroscope assembly. Consequently, numerous readouts of subsequent discharges of the electroscope 12 can be performed without seriously reducing the potential on the center plate 16 of the detector capacitor.

The thickness of the center plate of the detection capacitor, i.e., the layer 16 of the higher atomic number Z and the lower atomic number insulator layer 18 are selectively chosen so that the capacitance to electroscope ground of the center plate 16 is large, thus optimizing the radiation induced charging of the center plate. Because of this large capacitance, the induced voltage on the center plate 16 of the detection capacitor 10 is too low to be read directly by the electroscope 12 by itself; however, by means of the variable capacitor 14, this problem is overcome. The capacitor 14 is set at its maximum value when the charge on the center plate 16 is transferred by momentarily connecting the needle element 26 to the center plate 16. Following this, the variable capacitor 14 is then reduced, thus raising the voltage on the electroscope 12. The dose is then determined by reduction in capacitance necessary to raise the voltage across the electroscope 12 to a predetermined value.

Figure 2:
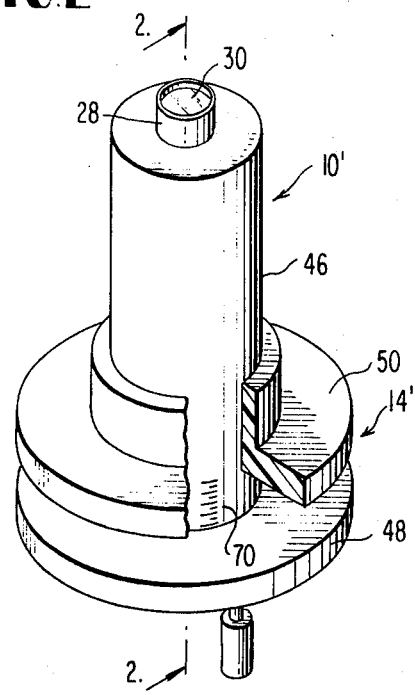
FIG. 2 is a perspective view illustrative of the preferred embodiment of the subject invention.
Figure 3:
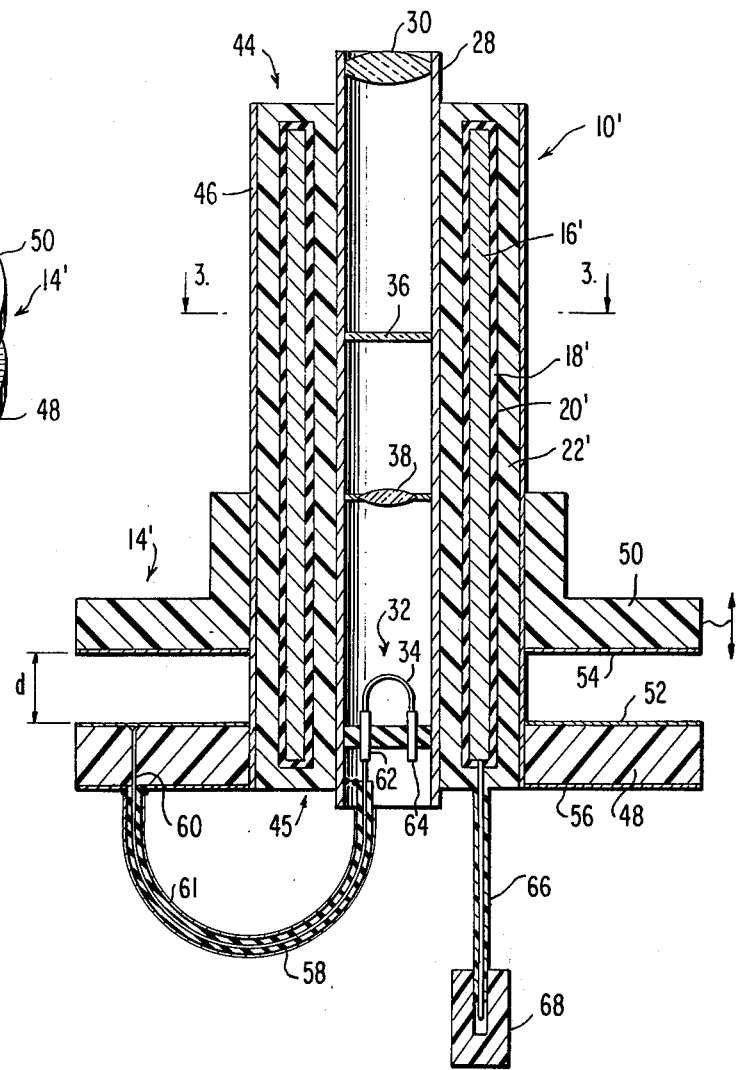
FIG. 3 is a central longitudinal cross sectional view taken along the line 2—2 of the embodiment shown in FIG. 2.
Figure 4:
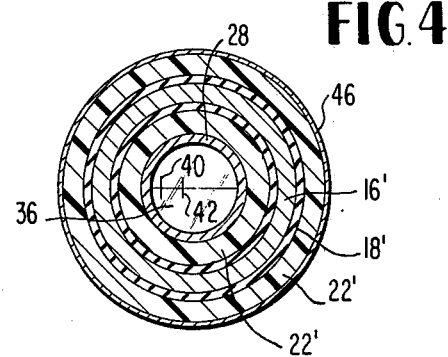
FIG. 4 is a cross-sectional view of the embodiment shown in FIG. 3 taken along the line 3—3 thereof.

Referring now to the preferred embodiment of the subject invention, and more particularly to FIGS. 2, 3 and 4, reference numeral 28 designates a barrel for a dosimeter including at one end a microscope lens 30, and at the other end a quartz fiber electroscope 32 including an inverted horseshoe shaped fiber element 34 and frame, not shown. Intermediate the microscope lens 30 which forms an eyepiece and the electrometer 32 is located a reticle 36 and a second microscope lens 38. The quartz fiber 34 is thus positioned inside the barrel 28 so as to be visible on the reticle 36 in the discharged state. More particularly, it is adapted to be visible over a zero mark 40 (FIG. 4) when the electrometer is discharged and over a witness mark 42 for a predetermined charge state.

A radiation detection capacitor 10' is concentrically formed around the electroscope barrel 28 and consists of an embedded layer 16' of relatively high atomic number Z material, for example aluminum, embedded in an intermediate layer 18' of polyethylene terephthalate covered by a film of "Aquadag" 20' and an outer layer 22' of hydrogenous material e.g. polyethylene. The ends 44 and 45 of the assembly are potted with an epoxy compound to make the assembly air tight. It is then inserted in a tubular aluminum pipe 46 which acts as a rigid outer housing for the dosimeter. A variable capacitor 14' is formed on the outer surface of the tubular housing 46 and comprises an annular disc 48, which is rigidly secured to one extremity of the tubular housing 46, and a slidably movable annular disc 50. The discs 48 and 50 are comprised of a material such as lucite and include metalized surfaces 52 and 54. The other or outer surface 56 of the fixed annular disc 48 is coated with a conductive coating also. The variable capacitor 14' is connected to the electroscope 32 by means of coaxial conductor cable 58 having its inner conductor 60 coupled to pin 62, which is directly connected to the quartz fiber 34 and frame, not shown. The outer conductor 61 of cable 58 is connected to the conductive surface 56.

A second pin, 64, is also coupled to the quartz fiber 34 and frame for purposes of accepting charge transfer from the detector capacitor 10'. Charge transfer is effected by means of an insulated wire 66, having one end connected to the aluminum layer 16'. The opposite end of the insulated wire 66 is exposed but is normally covered by an insulated cap 68; however, when the charge is to be transferred to the electrometer 12', the cap 68 is removed and the exposed end of the wire 66 is momentarily touched to the pin 64. The dosage is read by separating the condenser plates 48 and 50 until the electroscope fiber 34 points to the witness mark 42, which is effectively the same procedure followed with respect to the configuration shown in FIG. 1, with the exception that the distance d between the conductive surfaces 52 and 54 is calibrated in units of dose. The calibration marks 70 are carried on housing 46 in the form of indicia as shown in FIG. 2 and is similar to that appearing on the barrel of a standard micrometer. When desirable, a modification of the variable capacitor 14' can be obtained by the use of two concentric pipes sliding in and out of each other, i.e., using the "trombone" principle.

Zeroing the readout is accomplished by grounding the electroscope 32 momentarily by touching a finger to the pin 64. Erasing the accumulated charge on the layer 16' is accomplished by touching the exposed end of the charge transfer wire 66 with the cap 68 removed.

The bulk material utilized by the subject invention for the hydrogenous material has been noted to be preferably polyethlene, however, when desirable, other low Z materials may be utilized such as polystyrene. The quantum energy response of the dosimeter, however, is defined by this material, and therefore should be close to human tissue equivalent. The part consisting of a relatively high Z material can be made extremely thin (0.1 x range of the electrons) without influencing the performance. However, in this case, the Bragg-Grey principle applies, making the influence of the higher Z material on the energy dependence relatively small.

The ratio of gamma to fast neutron response can also be regulated by choosing the type and thickness of the insulating layer and also by choosing the thickness and material of the higher Z layer.

It should be pointed out that space charge saturation (Langmuir saturation) does not occur in the subject invention because of the high quantum energies involved and because no recombination effects take place. Even with the highest obtainable dose rates, there is no effect which makes the instrument dose-rate dependent. Other attendant advantages also result from the present invention, some of which are: there is no need for additional equipment such as a charger or reader; no need for a power source; little or no maintenance; it provides a rigid environment-proof construction; is adapted for operability between −40° F and +155° F; the instrument can be zeroed at will; there is dose rate independence up to $10^{10}$rad/second; can be made tamper proof and provides readout in the form of tissue rads; and exhibits relatively little drift in readout (less than 3rad/day).

Having thus disclosed what is at present considered to be the preferred embodiment of the subject invention,

I claim:

1. A dosimeter comprising in combination:
electroscope means and indicator means therefor providing an indication of the charged state of the electroscope;
a variable capacitor electrically coupled in parallel with said electroscope;
a radiation detection capacitor formed of material of a relatively large atomic number surrounded by a material of less atomic number whereby exposure of radiation causes an electrical charge to be built up on said material of relatively large atomic number; and
means for transferring the charge from said detection capacitor to said electroscope and said variable capacitor, wherein said electroscope is charged thereby and said variable capacitor is reduced in capacitance value thereafter to raise the voltage on said electroscope to a predetermined value with the dose being determined by the reduction in capacitance of said variable capacitor necessary to raise the electroscope to said predetermined voltage.

2. The dosimeter as defined by claimm 1 wherein said variable capacitor additionally includes calibrated indicia associated therewith which is calibrated in units of dosage.

3. The dosimeter as defined by claim 2 wherein said electroscope means comprises quartz fiber electroscope means and a microscope integral therewith for viewing said electroscope means relative to said indicator means.

4. The dosimeter as defined by claim 1 wherein the material of a relatively large atomic number comprises a layer of metallic material and said material of lesser atomic number comprises insulator material.

5. The dosimeter as defined by claim 4 wherein said insulator material comprises hydrogenous material.

6. The dosimeter as defined by claim 5 wherein said radiation detection capacitor additionally includes an intermediate layer of insulator material separating said layer of metallic material from said layer of hydrogenous material.

7. The dosimeter as defined by claim 6 wherein said radiation detection capacitor is integrally formed on the outside surface of said electroscope means.

8. The dosimeter as defined by claim 7 wherein said electroscope and radiation detection capacitor comprise a unitary assembly and additionally including a cylindrical housing into which said assembly is fitted.

9. The dosimeter as defined by claim 8 wherein said cylindrical housing is comprised of metallic material.

10. The dosimeter as defined by claim 8 wherein said variable capacitor is located on the outer surface of said housing.

11. The dosimeter as defined by claim 10 wherein said variable capacitor comprises a first capacitor plate element fixedly attached to the outer surface of said housing and a second capacitor plate element slidably mounted on the outer surface of said housing, said housing additionally including indicia thereon in the separation between said capacitor plate elements, said indicia being calibrated in units of radiation dosage.

12. The dosimeter as defined by claim 11 wherein said first and second capacitor plate elements comprise annular discs having an electrically conductive coating on mutually opposing faces thereof.

13. The dosimeter as defined by claim 12 wherein said means transferring said charge to the electroscope comprises a charge transfer wire attached to said material of a relatively large atomic number and having an exposed other end which is adapted to be placed in electrical contact with said electroscope, and a protective insulating cap normally applied to said exposed end of said charged transfer wire.

14. The dosimeter as defined by claim 1 wherein said material of a relatively large atomic number comprises aluminum and said material of lesser atomic number comprises polyethylene.

15. The dosimeter as defined by claim 1 wherein said detection capacitor is comprised of a metal layer surrounded by a first insulating layer of electrically insulating material, a coating of graphite over said first insulating layer, a second layer of electrically insulating material over said first insulating layer coated with graphite, said second insulating layer also being coated by a coating of graphite.

16. The dosimeter as defined by claim 15 wherein said layer of metallic material comprises aluminum, said first layer of electrically insulating material comprises polyethylene terephthalate, and said second layr of insulating material comprises polyethylene.

* * * * *